H. R. HUGHES.
ROTARY BORING DRILL.
APPLICATION FILED MAR. 18, 1915.
1,204,022.
Patented Nov. 7, 1916.
2 SHEETS—SHEET 1.
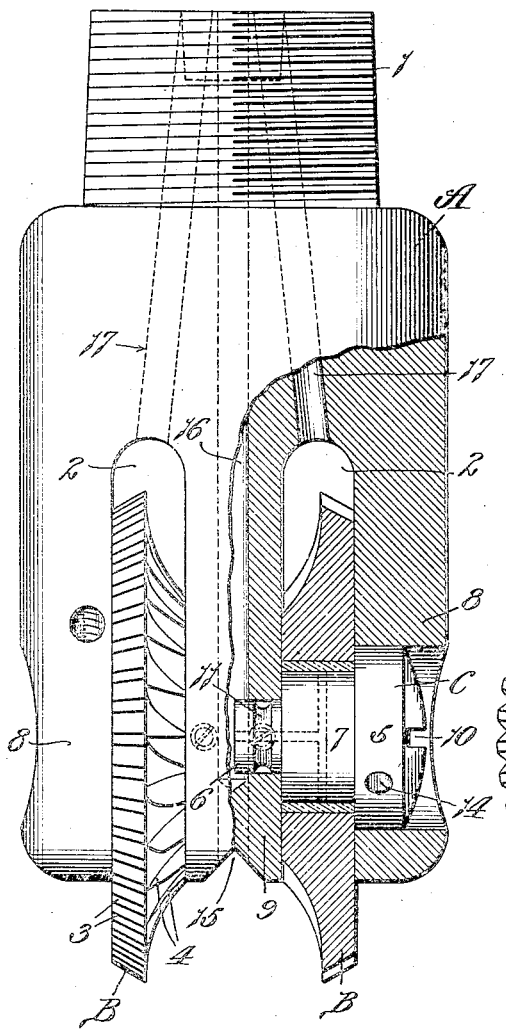
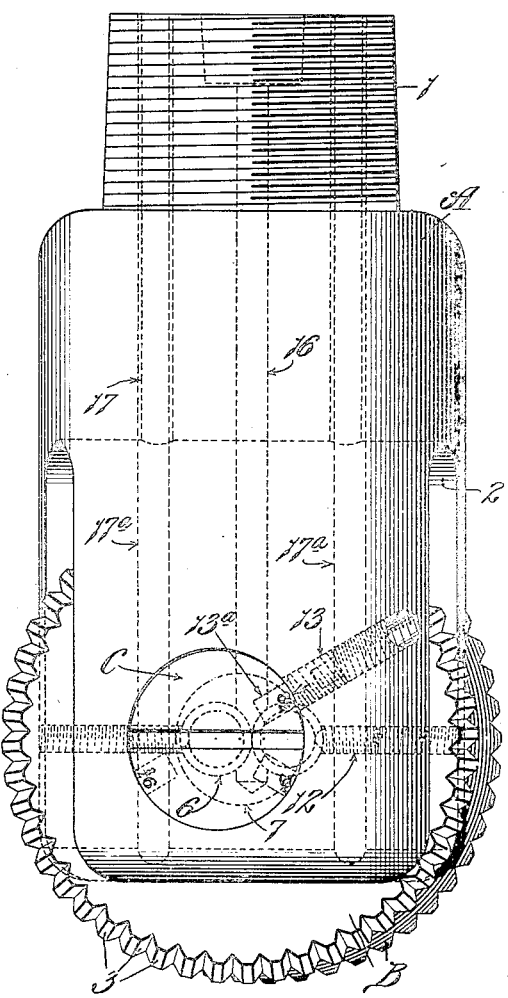
Witnesses:
Geo. R. Hadson
Inventor,
Howard R. Hughes.
By Caswell Shurr Attys.

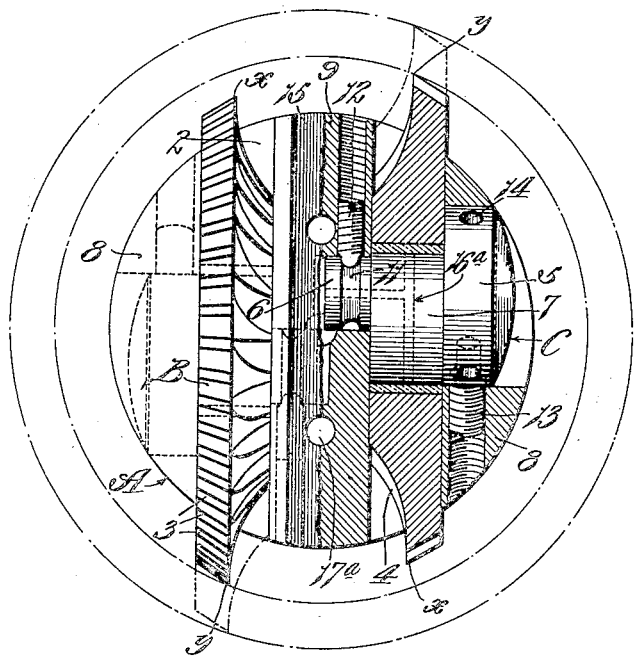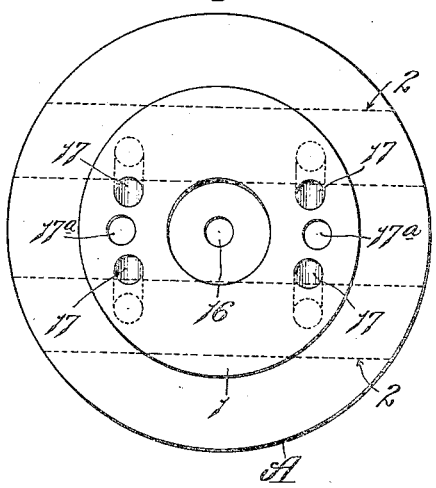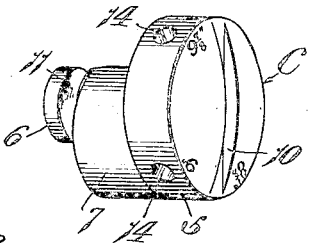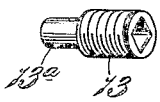

UNITED STATES PATENT OFFICE.

HOWARD R. HUGHES, OF HOUSTON, TEXAS, ASSIGNOR TO HUGHES TOOL COMPANY, OF HOUSTON, TEXAS, A CORPORATION OF TEXAS.

ROTARY BORING-DRILL.

1,204,022.      Specification of Letters Patent.      Patented Nov. 7, 1916.

Application filed March 18, 1915. Serial No. 15,194.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type in which the head is provided with cutters that scrape off the material from the side of the hole when the drill is in operation.

One object of my present invention is to provide a drill of the type mentioned in which the cutters are adjustably mounted on the head of the drill in a novel manner.

Another object is to provide a rotary boring drill of the type commercially known as a disk drill, which is so designed that there is little tendency for the dis-integrated material to become packed around the cutters or become packed at the bottom of the hole when the drill is in operation.

Other objects and desirable features of my invention will be hereinafter pointed out.

Figure 1 of the drawings is a front elevational view, partly broken away, of a rotary boring drill constructed in accordance with my invention. Fig. 2 is a side elevational view of said drill. Fig. 3 is a bottom plan view partly in horizontal section of the drill shown in Figs. 1 and 2. Fig. 4 is a top plan view of the head of the drill. Fig. 5 is a perspective view of one of the adjustable cutter-supporting members; and Fig. 6 is a perspective view of the locking device for retaining said cutter-supporting member in adjusted position.

Referring to the drawings, which illustrate the preferred form of my invention, A designates the head of the drill which is provided at its upper end with a screw-threaded portion 1 for receiving the hollow drill stem (not shown). Two circular-shaped cutters B are mounted on the head A in such a manner that the edge portions of same will scrape off the material from the side of the hole when the drill is in operation. The cutters B of the drill herein shown are substantially disk-shaped and are arranged in an upright position on the head of the drill. I prefer to arrange the cutters B parallel to each other in two vertically-disposed pockets 2 that extend transversely through the head A at right angles to the axis of rotation of the cutters B. It is immaterial, however, so far as my broad idea is concerned, whether the cutters B are arranged in a vertical position and in parallel relation to each other in pockets formed in the head of the drill, as said cutters could be arranged in various other ways without departing from my present invention. The axes of the cutters B are preferably staggered or offset slightly in a horizontal plane with relation to each other, as shown in Fig. 3, so that the rear edges $x$ of same will not drag against the side wall of the hole when the advancing edges $y$ of said cutters are acting on the side wall of the hole.

The cutters B of the drill herein shown have beveled edge portions that are provided with transversely-disposed cutting teeth 3, the cutters being so arranged that the beveled edge portions of same will conform approximately to the circular shape of the hole. Each cutter is also provided on its inner side with radially-disposed cutting teeth 4 which coöperate with the edge teeth 3 to disintegrate the material at the bottom of the hole and also increase the traction of the cutters on the bottom of the hole, thus insuring the cutters turning constantly when the drill is in operation. While I prefer to equip the drill with cutters B of the kind above described, it will, of course, be obvious that various other kinds of cutters could be used.

The cutters B are mounted on the head A in such a manner that they can be adjusted in various positions, thereby compensating for wear and enabling the drill to be used for boring holes of different diameters. When said cutters are arranged in one position the advancing cutting edges $y$ of same will be located a certain distance from the center axis of the head of the drill, thus causing a circular hole of a certain diameter to be formed when the head A is rotated; when the cutters are arranged in another position, indicated in broken lines in Fig. 3, the advancing cutting edges of same will be located farther from the center axis of the drill head and they will thus form a larger hole and when said cutters are arranged in still another position they will form a circular hole of still greater diameter. In other words, the cutters B are mounted on the head A of the drill in such a manner that they can be adjusted transversely of the head so as to cause the advancing edge portion of each cutter to project laterally, more or less, from the outer surface of the head A I prefer to mount each cutter on a shaft or adjustable supporting member provided with an eccentric portion which causes the cutter to be moved inwardly or outwardly with relation to the side of the head A when said supporting member is rotated in one direction or the other. The adjustable cutter-supporting members of the drill herein shown preferably consist of pins or short shafts C adjustably mounted in the head A and each of which is provided with a cutter bearing that is arranged eccentric to the axis about which said member turns when it is being adjusted. As shown in Figs. 3 and 5, each of the cutter-supporting shafts or members C is provided with two cylindrical-shaped portions 5 and 6 that are arranged on opposite sides of a cylindrical-shaped cutter bearing 7 on which the cutter turns, the cutter bearing portion 7 being arranged eccentric with relation to the end portions 5 and 6. The members C are rotatably mounted in the head of the drill and means are provided for securely locking said members in adjusted position.

In the drill herein shown the portions 5 at the outer ends of the members C fit snugly in circular openings in side bearing 8 on the head of the drill and the portions 6 at the inner ends of said members C fit snugly in circular openings in the center bearing 9 on the drill head which lies between the two cutters, as shown clearly in Figs. 1 and 3. When the members C are turned in one direction the cutter bearing portions 7 thereon will move transversely of the head, and thus shift the cutters laterally so that the advancing cutting edges y of same that act on the side wall of the hole will be located farther away from the axis of rotation of the drill head—the continued movement of the members C in this direction, up to a certain point, carrying the advancing cutting edges of the cutters farther away from the vertical axis of the drill head. Each of the members C is preferably provided with means for enabling it to be turned when it is desired to change the position of the cutters B, the means herein shown for this purpose consisting of slots or recesses 10 in the outer ends of the members C that are adapted to receive a screwdriver or other suitable tool. The inner end portions 6 of the cutter-supporting members C are preferably of less diameter than the outer end portions of same, so that said portions will not take up too much space in the center bearing 9 on the head of the drill, and annular grooves 11 are formed in said portions 6 to receive dowel pins or retaining screws 12 that prevent the members C from moving longitudinally of their axes, said retaining devices 12 being so arranged that they will not interfere with the rotary movement of the members C when they are being adjusted to change the positions of the cutters B. The locking means that holds the cutter-supporting members in position can either be so designed that said members can be adjusted fractionally from zero up to the maximum adjustment of the cutters, thereby enabling the cutters to be adjusted so as to compensate for wear, or said locking means can be so designed that the cutter-supporting members C can be adjusted into only three or four positions. The locking means for the cutter-supporting members C of the drill herein shown is so designed that the drill can be used to form an 8½ inch hole, a 9 inch hole or a 9¾ inch hole, said means consisting of set screws 13 in the side bearings 8 of the head that engage the outer end portions 5 of the members C, and thus securely clamp said members in adjusted position. If desired, each of said set screws 13 can be provided at its inner end with a reduced portion 13$^a$ that is adapted to enter one of a plurality of holes 14 formed in the periphery of the portion 5 of the member C with which said set screw coöperates.

At the lower end of the head A of the drill is a cutting means consisting of a substantially inverted V-shaped groove 15 that extends transversely across the head between the cutters B, the edges of said groove causing the core at the bottom of the hole which lies between the cutters B to be destroyed progressively when the drill is in operation. The head A is provided with a center lubricating duct 16 that leads downwardly from a lubricant holder (not shown) to distributing ducts 16$^a$ that are formed in the cutter-supporting members C, so as to supply a lubricating medium to the bearing surfaces on which said cutters turn. The head A is also provided with water courses or passage-ways which are so disposed that jets of flushing water will be discharged downwardly onto the cutters B and also downwardly onto the disintegrated material at the bottom of the hole, thus preventing the disintegrated material from becoming packed around the cutters or from becoming packed at the bottom of the hole, and thus making the drill particularly adapted for drilling in soft formations like gumbo and shale. As shown in broken lines in Figs. 1 and 2, water courses 17 lead downwardly from the upper end of the head A and terminate at the upper ends of the pockets 2 in which the cutters B are arranged, thereby causing jets of flushing water to be discharged downwardly onto said cutters, and thus preventing the disintegrated material from clinging to the edge portions of the cutters or from packing in the open spaces in the head in which said cutters are arranged. Water courses 17ª also lead downwardly from the upper end of the head and terminate in the lower end face of the head, preferably in the inverted V-shaped groove 15 that extends transversely across the head, the jets of flushing water that emerge from the water passage-ways 17ª being discharged downwardly onto the disintegrated material at the bottom of the hole, and thus preventing said material from becoming packed at the lower end of the drill head between the cutters B.
In a drill of the construction above described the cutters B can be adjusted laterally to compensate for wear on the cutting edge portions of same, and said cutters can also be arranged in various positions so as to enable the drill to be used to form holes of various sizes. The cutters can be adjusted easily and without the necessity of disconnecting the head from the drill stem, and the cutters are mounted on the head in such a manner that the drill is as strong and serviceable as a drill provided with non-adjustable cutters.

If desired, the members C can be provided at their outer ends with marks or characters, as shown in Figs. 2 and 5, that coöperate with marks or arrows on the head to indicate when the holes 14 in the members C are in alinement with the locking devices 13, thus facilitating the adjustment of the cutters B.

Having thus described my invention, what I claim, and desire to secure by Letters Patent, is:

1. In a rotary boring drill, a head, a rotatable cutter arranged on said head in such a manner that it scrapes off the material from the side wall of the hole when the drill is in operation, and a rotatably adjustable bearing for said cutter having its opposite ends supported in the head and provided with an eccentrically-disposed portion on which said cutter turns, said bearing being adapted to be adjusted without removing it from the head so as to vary the distance between the center axis of the head and the portion of the cutter that acts on the side wall of the hole.

2. In a rotary boring drill, a head, a rotatable cutter arranged on said head in such a manner that it scrapes off the material from the side wall of the hole when the drill is in operation, a substantially horizontally-disposed adjustable shaft having its end portions rotatably mounted in said head, said shaft being provided with an eccentric bearing portion on which said cutter turns, and means for locking said shaft in the head so as to hold said eccentric bearing portion in adjusted position.

3. In a rotary boring drill, a head provided with an opening, an upright cutter arranged in said opening and projecting laterally from one side of said head, an adjustable shaft extending across said opening and having its end portions supported in the head, and an eccentrically-disposed cylindrical bearing on said shaft, on which said cutter turns, said shaft being adapted to be turned in the head so as to vary the position of said eccentrically-disposed bearing, and thus adjust the edge portion of the cutter inwardly and outwardly with relation to the side of the head.

4. A rotary boring drill, comprising a head provided with a center bearing and two side bearings, rotatable cutters arranged in a substantially upright position between said bearings, and substantially horizontally-disposed shafts adjustably mounted in the head in said center bearing and side bearings and provided with eccentrically-disposed portions on which said cutters revolve, said shafts being adapted to be turned in the head so as to vary the position of said eccentrically-disposed bearing portions, and thus change the distance between the edge portions of the cutters and the vertical axis of the head.

5. A rotary boring drill, comprising a head provided with transversely-disposed slots, rotatable cutters arranged in said slots and projecting laterally slightly beyond the head, adjustable supporting members for said cutters having their ends rotatably mounted in the side wall portions of said slots and adapted to be turned in the head into various positions, without removing them from the head, and means carried by said members for causing the distance between the center axis of the head and the portions of the cutters that act on the side wall of the hole to be varied when said members are turned.

6. A rotary boring drill, comprising a head provided with a center bearing and side bearings, a pair of rotatable cutters housed in the head and projecting laterally in opposite directions from the head, adjustable shafts having their inner and outer ends supported by said center and side bearings and provided with eccentric portions on which said cutters revolve, said shafts being adapted to be turned in the head so as to change the position of said eccentric portions, and thus shift the edge portions of the cutters toward or away from the vertical axis of the head, and means for preventing said shafts from turning relatively to the head when the drill is in operation.

7. In a rotary boring drill, a head, a substantially horizontally-disposed shaft adjustably mounted in the head and having its end portions supported by the head, an eccentric bearing on said shaft, a cutter rotatably mounted on said bearing, said shaft being adapted to be turned into different positions and then locked in adjusted position so as to vary the distance between the edge portion of the cutter and the center axis of the head, and a device in the head arranged at substantially right angles to said shaft and in engagement with same for preventing said shaft from moving longitudinally of its axis.

8. In a rotary boring drill, a head, a substantially horizontally-disposed shaft adjustably mounted in the head and having its end portions supported by the head, an eccentric bearing on said shaft, said shaft being adapted to be turned in the head so as to arrange said eccentric bearing in different positions, a cutter rotatably mounted on said bearing, a device in the head arranged at substantially right angles to said shaft and in engagement with same for preventing said shaft from moving longitudinally of its axis, and independent means for locking said shaft against rotation so as to hold the eccentric bearing on the shaft in adjusted position.

9. A rotary boring drill, comprising a head provided with a center bearing and two side bearings, rotatable cutters arranged between said bearings and having their axes offset or staggered slightly in a horizontal plane, supporting shafts for said cutters provided at their inner ends with reduced portions that are seated in said center bearing, eccentrically-disposed portions on said shafts on which said cutters revolve, said shafts being adapted to be turned so as to change the position of the cutters on the head, means on the head for locking said shafts in adjusted position, and coöperating means on said shafts and head for indicating the adjustments of said shafts.

10. A rotary boring drill, comprising a head provided at its lower end face with a transversely-extending groove having cutting edges that disintegrate the material at the bottom of the hole, rotatable cutters arranged in the head on opposite sides of said groove and in substantially parallel relation to same, and water courses in the head arranged in such a manner that jets of flushing water will be discharged onto said cutters and also downwardly into said groove at a point below the axes of said cutters.

In testimony whereof I hereunto affix my signature in the presence of two witnesses, this sixth day of March, 1915.

HOWARD R. HUGHES.

Witnesses:
J. G. DINGLE,
L. P. HIRTZ.